June 9, 1959

L. A. RUNTON ET AL 2,890,041

SELF-LUBRICATING SPRING LINER PAD

Filed Aug. 22, 1957

INVENTORS
LESLIE A. RUNTON
HENRY C. MORTON

BY

ATTORNEY 2,890,041

SELF-LUBRICATING SPRING LINER PAD

Leslie A. Runton, Middle Haddam, and Henry C. Morton, Branford, Conn., assignors to The Russell Manufacturing Company, Middletown, Conn., a corporation of Connecticut Application August 22, 1957, Serial No. 679,603

1 Claim. (Cl. 267—49)

This invention relates to spring liner pads for separating the spring leaves of automobile leaf springs and the like and has for an object to provide a self-lubricating pad of the above type having novel and improved characteristics.

More specifically the pad consists of a resin base in which a flock composed of Teflon (tetrafluoroethylene) fibers is embedded. The Teflon flock has a high dimensional stability without cold flow under pressure and is characterized by a low coefficient of friction which decreases with increased pressure. The coefficient of friction is so low that lubrication is unnecessary under the conditions to which a spring liner pad is normally subjected.

The nature of the invention will be better understood from the following description taken in connection with the accompanying drawing in which a specific embodiment has been set forth for purposes of illustration.

Figure 1:
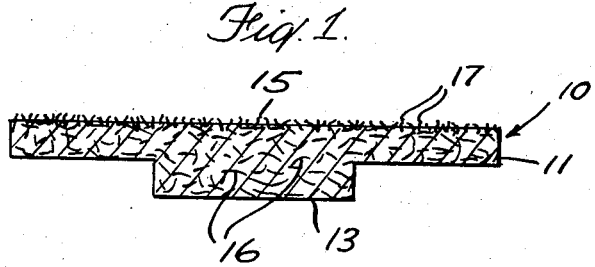
Fig. 1 is a transverse section through a liner pad embodying the invention.

Referring to the drawing more in detail the pad 10 comprises a flat base 11 which is disposed between the ends of the leaves 12 of a standard leaf spring, and a boss 13 which seats in a hole or recess 14 in the lower of the two leaves 12 between which the pad 10 is sandwiched.

The general shape and use of such a pad is shown more in detail in Walters Patent No. 2,681,223, dated June 15, 1954.

In accordance with this invention the pad 10 is composed of a molded resin such as polyvinylchloride, epoxy resins, a phenolic resin or a natural or synthetic rubber having embedded therein at least in the upper portion and on the upper surface 15 a flock 16 composed of short lengths, such as of the order of ½ mm. to 1½ mm. of Teflon filament.

In the case of a liquid such as polyvinylchloride the liquid may be placed in an open top mold the proper shape to form the pad and the flock sprinkled over the surface of the liquid and worked into the liquid by combing or stirring. Additional fine flock of the order of ½ mm. may be dusted onto the upper surface 15 of the liquid to form a felt-like surface layer 17. The mold may then be heated to the polymerizing temperature for polyvinylchloride, i.e. 350° F. to 360° F. and immediately cooled to set the resin to solid form with the Teflon flock embedded therein and exposed on the upper surface.

Figure 2:
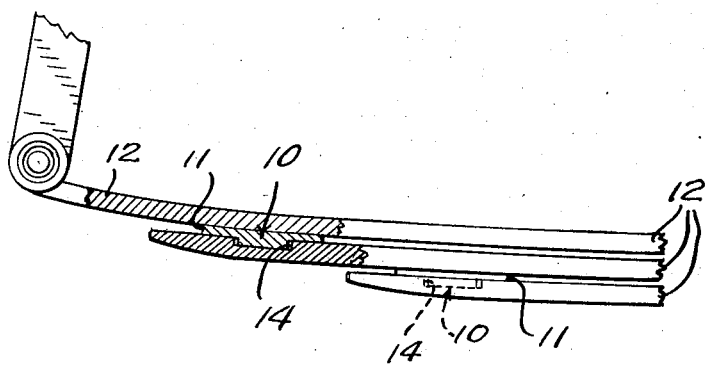
Fig. 2 is a broken elevation of a portion of a leaf spring assembly showing the liner pad in position.

When this pad is placed between the spring leaves 12 as shown in Fig. 2 the Teflon forms an antifriction bearing surface which requires no lubrication.

In the event of wear additional quantities of flock are exposed to contact the upper leaf and to take the compression load to which the pad is subjected. As the wear on the Teflon is negligible the pad has a long useful life.

The polyvinyl chloride resin is preferably plasticized as by tricresyl phosphate to a non-brittle form so that the pad will conform under the pressure of the spring leaves to the shape of the contacting surfaces.

The epoxy resins are thermosetting and may be applied to the mold in the form of a molding powder. The Teflon flock is incorporated in the molding powder prior to curing. The mixture is cured by heating to the proper temperature to convert the resin into the form of a solid body in which the Teflon flock is embedded and is exposed on the surface as in the case of the polyvinyl chloride resin above described. The body may also be composed of a high strength phenolic bonding resin derived from the reaction product of phenol, cresol or a homologue with formaldehyde under controlled conditions. The Teflon flock is mixed with the resin molding powder in the desired proportion prior to setting. The mixture is pre-heated to remove the solvent and the resin content polymerized until a residual volatile content of 5% to 7% is attained. The mixture is then molded under heat and pressure to the form shown in Fig. 1. The conversion of the resin into a thermoset form may be accomplished at a temperature of 300° F. to 350° F. for from thirty to sixty minutes at pressures of 10 tons to 100 tons, depending upon the area of the object being molded.

A rubber base may also be used by mixing the Teflon flock with the natural or synthetic latex, drying and vulcanizing to cured form.

In the above embodiments the base is plasticized to a non-brittle form so as to be readily shaped during use.

What is claimed is:

A spring liner pad for separating the leaves of leaf springs comprising a base composed of a molded resin adapted to be positioned between such leaves and a boss formed integral with said base to seat in a corresponding recess in one of said leaves, and flock composed of Teflon yarn having a length of the order of ½ mm. to 1½ mm., anchored in said base and exposed on the surface thereof to form an antifriction bearing surface for said spring leaves.

References Cited in the file of this patent

UNITED STATES PATENTS

| 2,246,879 | Dow | June 24, 1941 |
| 2,497,224 | Laure | Feb. 14, 1950 |
| 2,702,188 | Sterne | Feb. 15, 1955 |

FOREIGN PATENTS

| 730,655 | Great Britain | May 25, 1955 |